United States Patent Office 3,042,537
Patented July 3, 1962

3,042,537
GYPSUM PLASTER
W. J. Newell, 421 Conner Ave., and James E. Madden, 4709 Calmont St., both of Fort Worth, Tex.
No Drawing. Filed June 23, 1961, Ser. No. 125,900
8 Claims. (Cl. 106—110)

This invention relates to an improved gypsum plaster. More particularly it relates to gypsum plasters having a workability and a plasticity which have been substantially increased by the addition of small but significant amounts of finely divided siliceous material to the basic gypsum plaster composition.

This application is a continuation-in-part of Newell et al. application Serial Number 844,637, filed October 6, 1959, and now abandoned.

One object of the invention is to produce a stronger gypsum plaster than those heretofore commercially available.

Another object of the invention is to provide a gypsum plaster formulation which exhibits a low shrinkage and which is therefore less susceptible to crack development.

Still another object is to provide a gypsum plaster having greatly enhanced cohesive properties which facilitate the even application of relatively thick coats on vertical surfaces without slippage.

Still a further object of the invention is to minimize or to eliminate the requirement of lime as an addition to gypsum, by the use of a specific type of siliceous material, whereby the benefits associated with lime additions, namely: increased workability and fattening are obtained without any of the disadvantages inherent in the use of lime additions, namely weakening the strength of the plaster.

Still another object is to provide a gypsum plaster containing a particular, exceedingly finely divided silica, which can be stored dry for indefinitely long intervals without experiencing any loss in effectiveness.

Finally it is an object of the present invention to provide a material which can be successfully applied by the mechanic or plasterer with great ease and with more uniform results than the plasters heretofore known.

These and other objects are achieved by the incorporation of an exceedingly finely divided silica having a particle size up to about 40 millimicrons and preferably consisting predominantly of particles up to about 20 millimicrons. Additions as little as between ¼% and ½% by weight of the gypsum in the plaster composition greatly improve cohesiveness, workability, plasticity and set up time of the gypsum plaster and either completely eliminate the need for adding lime or greatly reduce the amount of lime, which would normally be required. Amounts of the silica up to about 1% are generally completely adequate for the purpose. More can be added, e.g. up to about 2%, to produce an especially smooth plaster for special applications, but will generally not be required in normal plaster usage. The benefits of our invention are realized with additions of the silica up to about 10%, but beyond 2% and in many cases even beyond 1%, increased amounts generally do not provide sufficient additional improvement to make it economically worthwhile. Amounts above 10% introduce difficult mixing problems because of the very low bulk density of the silica.

We have found particularly suitable for our purpose silica produced by the vapor phase hydrolysis of $SiCl_4$ at a temperature below the sublimation temperature of silica so that the silica product is formed in solid phase. Such a product can be obtained by the hydrolysis of $SiCl_4$ vapor in a hydrogen-oxygen flame.

The siliceous produce which it is preferred to use in the gypsum plasters of the present invention is a solid produced by reacting $SiCl_4$, hydrogen and oxygen in the vapor phase, to yield HCl and a solid silica product: a colloidal silica having a particle size range of between about 0.015 and 0.020 micron, a silica content on a moisture-free basis of between 99.0% and 99.7% and a high external surface area on the order of 175–200 sq. meters per gram. The silica recovered from the process is purged of acid and when dispersed in water, after purification, the silica has a pH of between about 3.5 and 4.2.

While we do not wish to be bound by any specific theory, we believe that silica produced in the manner described above and which has never been condensed from a silica vapor, has surface characteristics and an absence of internal porosity which appear markedly to improve the workability of plasters in which it is incorporated, it being noted that the addition of as little as ¼% by weight results in a noticeable improvement in the gypsum plasters of this invention as compared with those heretofore known.

Other finely divided silica solids may be used provided they have properties which are generally similar to and equivalent to those set forth above. For instance the silica could be obtained by the vapor phase hydrolysis at a temperature below the decomposition temperature of silica, of a silicoalkide, hydride or halide such as $SiHCl_3$, $SiH_4$, or $SiCl_4$. These silicas could include the synthetic product of Dow Corning Corporation sold under the trade name DC Silica, or the product Cab-o-sil marketed by Godfrey L. Cabot, Inc., the production of which is described in Industrial and Engineering Chemistry, vol. 51, pages 232–238, published March 1959.

This invention will be more fully understood from a consideration of the following description in which a number of specific formulations are given by way of example, but these are not to be considered as limitative of the invention.

Since there are numerous generally accepted classes of gypsum plasters, the present invention will be described with illustrative examples of formulations in such art recognized classes, but it should be understood that the invention is applicable to virtually any gypsum plaster in which lime has been found to be useful as a spreading agent. In each of the gypsum plasters exemplified, the addition of between ½% and ¾% by weight of finely divided silica of the type described above resulted in a marked improvement in workability.

KEENE'S CEMENT

Keene's cement is a high strength, slow set pure white gypsum plaster used to obtain extremely hard dense finished surfaces. In most formulations, lime putty is used to impart the necessary plasticity, the Keene's cement providing the strength. In the table below two mixtures formulated in accordance with the present invention are compared with a commonly used mixture.

*Prior Art*

|  | Parts by weight | A Parts by weight | B Parts by weight |
|---|---|---|---|
| Keene's Cement | 100 | 100 | 100 |
| Lime Putty (paste) | 25 | 10 |  |
| White Sand | 10 | 20 | 20 |
| Silica Fine (Cab-o-sil) |  | ¼ | ½ |

All three formulations are slow set materials. Because the lime putty is high in shrinkage, it is very hard to keep the plaster from checking when using the ratio identified as prior art above. There is a tendency in practice to add even more lime putty and sand than the relative proportions indicated above in an effort to reduce the tendency to check and to reduce the tendency of the trowel to drag when applying the plaster. Plasters formulated with less lime putty, e.g. those identified as "A" and "B" above exhibited a materially diminished tendency to form hair—or chip-cracks and worked more smoothly than the mixtures heretofore used.

WHITE COAT STANDARD MIX

A softer finish coat which is produced from a standard formulation for white coat, as it is commonly known, consists of 3 parts of the lime putty to 1 part of gauging plaster, by volume. By the addition of ¼ pound of finely divided silica of the type described above, it has been found possible to increase the relative proportion of plaster to a 1:1 ratio. As a result, a harder and denser surface, smoother and less porous than the surface obtained with an ordinary white coat is readily produced.

EXAMPLE

The following tests were made to determine the effect of different amounts of Cab-o-sil in imparting plasticity, workability, and spreadability to Keene's cement. In each test, the stated amount of Cab-o-sil was mixed with 100 parts of Keene's cement and the mix worked up in conventional manner. Each mix was then tested to determine its workability.

(1) ¾ part Cab-o-sil: This plaster mix had excellent plasticity, spreadability, and a good, pliable, fat feel under trowel.

(2) 2 parts Cab-o-sil: Plasticity and smoothness was markedly increased as compared with (1).

(3) 3 parts Cab-o-sil: This plaster possessed somewhat greater plasticity and smoothness than (2).

(4) 4 parts Cab-o-Sil: This plaster showed a slight increase in plasticity and smoothness as compared with (3).

(5) 5 parts Cab-o-sil: This plaster was practically indistinguishable from (4).

The term gypsum as employed in this specification is intended to mean either partially or completely dehydrated calcium sulfate and includes therefore anhydrite ($CaSO_4$), the hemihydrate, $CaSO_4 \cdot \tfrac{1}{2} H_2O$; plaster of Paris and similar calcium sulfates which may be further hydrated.

Although this invention has been described with reference to illustrative embodiments thereof, it will be apparent to those skilled in the art that the principles of this invention can be embodied in other forms but within the scope of the claims.

We claim:

1. A gypsum plaster consisting essentially of gypsum and a minor amount of colloidal silica obtained by vapor phase hydrolysis of a hydrolyzable silicon compound at a temperature below the vaporization temperature of silica, said colloidal silica comprising about ¼% to about 10% by weight of said gypsum.

2. A gypsum plaster consisting essentially of gypsum and a minor amount of colloidal silica obtained by vapor phase hydrolysis of a hydrolyzable silicon compound at a temperature below the vaporization temperature of silica, said colloidal silica comprising about ¼% to about 2% by weight of said gypsum.

3. The gypsum plaster of claim 2 in which the hydrolyzable silicon compound is $SiCl_4$.

4. The gypsum plaster of claim 2 which contains, in addition, lime in an amount which is substantially less than that required for equivalent workability in the absence of said colloidal silica.

5. The gypsum plaster of claim 3 which contains, in addition, lime in an amount which is substantially less than that required for equivalent workability in the absence of said colloidal silica.

6. The gypsum plaster of claim 3 which contains, in addition, sand filler.

7. The gypsum plaster of claim 4 which contains, in addition, sand filler.

8. The gypsum plaster of claim 5 which contains, in addition, sand filler.

References Cited in the file of this patent

UNITED STATES PATENTS

| | | |
|---|---|---|
| 111,267 | Smith et al. | Jan. 24, 1871 |
| 406,215 | Hart | July 2, 1889 |
| 2,078,198 | King | Apr. 20, 1937 |
| 2,539,408 | Ensign | Jan. 30, 1951 |
| 2,561,304 | Hazel | July 17, 1951 |
| 2,701,209 | Huntzicker | Feb. 1, 1955 |
| 2,803,556 | Carlsson | Aug. 20, 1957 |
| 2,820,714 | Schneiter | Jan. 21, 1958 |
| 2,905,566 | Schmidt | Sept. 22, 1959 |
| 2,912,342 | Fetterolf | Nov. 10, 1959 |

OTHER REFERENCES

Rock Products, January 1956, page 82.

Ind. Eng. Chem., volume 51, pages 232–238, March 1959.